US010694731B2

(12) United States Patent
Aston et al.

(10) Patent No.: US 10,694,731 B2
(45) Date of Patent: Jun. 30, 2020

(54) ITEM-RETENTION SYSTEM AND METHOD (71) Applicant: GRUV FISHING, INC., American Fork, UT (US)

(72) Inventors: Eric E. Aston, Farmington, UT (US); Kenneth I. Aston, Oakley, UT (US); Timothy G. Jenkins, Heber, UT (US)

(73) Assignee: Gruv Fishing, Inc., American Fork, UT (US)

( * ) Notice: Subject to any disclaimer, the term of this patent is extended or adjusted under 35 U.S.C. 154(b) by 0 days.

(21) Appl. No.: 15/992,153

(22) Filed: May 29, 2018

(65) Prior Publication Data

US 2018/0343844 A1   Dec. 6, 2018

Related U.S. Application Data (60) Provisional application No. 62/512,651, filed on May 30, 2017.

(51) Int. Cl.
*A01K 97/06* (2006.01)

(52) U.S. Cl.
CPC .................... *A01K 97/06* (2013.01)

(58) Field of Classification Search
CPC ................. A01K 97/00; A01K 97/06
See application file for complete search history.

(56) References Cited

U.S. PATENT DOCUMENTS

| | | | | |
|---|---|---|---|---|
| 1,025,430 | A | * 5/1912 | Sundee | E05B 65/025 292/162 |
| 2,610,430 | A | 9/1952 | Neiman | |
| 3,507,071 | A | * 4/1970 | Bryson | A01K 97/06 43/57.1 |
| 4,281,470 | A | * 8/1981 | Anderson | A01K 97/06 224/920 |
| 4,769,941 | A | 11/1988 | Schmidt | |
| 4,883,238 | A | 11/1989 | Harder | |

(Continued)

FOREIGN PATENT DOCUMENTS

| | | |
|---|---|---|
| CA | 1116133 A | 1/1982 |
| GB | 563829 A | 8/1944 |

(Continued)

OTHER PUBLICATIONS

FHF Fishing, http://fhfgear.com/fishing/fly-boxes, accessed Sep. 24, 2015, pp. 1-4.

(Continued)

*Primary Examiner* — Steven A. Reynolds
*Assistant Examiner* — Javier A Pagan
(74) *Attorney, Agent, or Firm* — Warren M. Pate; Pate Peterson, PLLC (57) ABSTRACT

A system and method for retaining and storing selected items is disclosed. The system may include a first hub, a second hub, a gap between the first and second hubs, and first and second flanges formed of an elastomeric material. The first flange may connect to the first hub and extend away therefrom and into the gap. Similarly, the second flange may connect to the second hub and extend away therefrom and into the gap. An item to be stored may be inserted into the gap between the first and second hubs. This inserting may deflect the first and second flanges. The resilience of the first and second flanges may hold the item in place within the gap.

19 Claims, 7 Drawing Sheets

(56) References Cited

U.S. PATENT DOCUMENTS

| | | | |
|---|---|---|---|
| 5,555,671 | A | 9/1996 | Voight et al. |
| 6,079,148 | A | 6/2000 | Yonenoi |
| 7,168,204 | B2 | 1/2007 | Wieringa et al. |
| 8,458,951 | B2 | 6/2013 | Taylor |
| 9,913,463 | B2 | 3/2018 | Aston et al. |
| 2018/0042209 | A1 | 2/2018 | Aston et al. |

FOREIGN PATENT DOCUMENTS

| | | |
|---|---|---|
| GB | 2189121 A | 10/1987 |
| JP | 08214749 A | 8/1996 |
| JP | 2001045941 A | 2/2001 |
| JP | 2003111548 A | 4/2003 |
| JP | 2010136673 A | 6/2010 |

OTHER PUBLICATIONS

FHFGear Photograph, http://www.fhfgear.com, accessed on or about Apr. 30, 2015, p. 1.

Bug Luggage, http://bugluggage.com/products.html, accessed Sep. 24, 2015, pp. 1-2.

Bug Luggage Photograph, http://bugluggage.com, accessed on or about Nov. 7, 2014, p. 1.

Declaration of Timothy G. Jenkins, pp. 1-5, dated Jan. 31, 2018.

Flambeau 0550 Spinnerbait Stickbait Box, https://www.cabelas.com/product/Flambeau-Spinnerbait-Stickbait-Box-with-Zerust/738820.uts, pp. 1-3, accessed Jun. 1, 2018.

Plano Alabama Rig Stowaway Box 3708, http://www.tacklewarehouse.com/Plano_Alabama_Rig_Stowaway_Box_3708/descpage-P3708.html, pp. 1-2, accessed Jun. 1, 2018.

Plano Elite 3607 Spinner Bait Organizer, http://www.indepthangler.com.au/review/plano-3607-spinnerbait-box/, pp. 1-9, accessed Jun. 1, 2018.

Plano Spoon Box, https://www.fishusa.com/product/Plano-Spoon-Boxes, pp. 1-5, accessed Jun. 1, 2018.

Shimano Minnow Tackle Boxes, http://www.billfishtacklesupply.com/storage/shminnow.htm, pp. 1-2, accessed Jun. 1, 2018.

\* cited by examiner

ITEM-RETENTION SYSTEM AND METHOD

RELATED APPLICATIONS

This application claims the benefit of U.S. Provisional Patent Application Ser. No. 62/512,651 filed May 30, 2017, which is hereby incorporated by reference.

BACKGROUND

Field of the Invention

This disclosure relates to systems and methods for retaining and storing items so that the items do not become entangled, damage one another, or the like.

BACKGROUND OF THE INVENTION

In the past, fishing tackle in the form of fishing lures, hooks, and artificial flies have often been stored in various compartments of a box. Such tackle has also been stored by inserting hooks into foam contained within a box. Both these approaches have significant drawbacks. For example, when multiple lures, hooks, or flies are stored in the same compartment, they will inevitably become entangled. Accordingly, before any lure, hook, or fly so stored may be used, it must be disentangled from the other tackle with which it has been stored. While inserting hooks in foam does help to keep lures, hooks, or flies separate, it has other problems. For example, with use, foam becomes compacted and loses the ability to resiliently return to its original shape. Accordingly, the ability of the foam to support or hold tackle degrades with time. In view of these drawbacks in current systems, what is needed are new systems and method for retaining and storing fishing tackle.

BRIEF DESCRIPTION OF THE DRAWINGS

The foregoing features of the present invention will become more fully apparent from the following description, taken in conjunction with the accompanying drawings. Understanding that these drawings depict only typical embodiments of the invention and are, therefore, not to be considered limiting of its scope, the invention will be described with additional specificity and detail through use of the accompanying drawings in which.

DETAILED DESCRIPTION OF SELECTED EMBODIMENTS

It will be readily understood that the components of the present invention, as generally described and illustrated in the drawings herein, could be arranged and designed in a wide variety of different configurations. Thus, the following more detailed description of selected embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

U.S. Provisional Patent Application Ser. No. 61/962,785 filed Nov. 18, 2013, U.S. patent application Ser. No. 14/547,037 filed Nov. 18, 2014, U.S. patent application Ser. No. 15/084,162 filed Mar. 29, 2016, and U.S. Provisional Patent Application Ser. No. 62/374,796 filed Aug. 13, 2016 are each hereby incorporated by reference.

Referring to FIGS. 1-4, a retention system 10 in accordance with the present invention may be described in terms of longitudinal 11a, lateral 11b, and transverse 11c directions extending substantially orthogonally with respect to one another. Accordingly, in selected embodiments, a retention system 10 and/or selected components thereof may have dimensions in the longitudinal direction 11a, the lateral direction 11b, and the transverse direction 11c.

In certain embodiments, a retention system 10 may comprise a supporting structure 12 and a plurality of inserts 14. A supporting structure 12 may support one or more inserts 14, provide securement locations for one or more inserts 14, or the like. One or more inserts 14 may, in turn, provide one or more locations for securing (e.g., receiving and retaining) one or more items (e.g., one or more pieces of fishing tackle such as fishing lures, hard baits, or fishing rods, one or more other items such as hand tools, garden tools, toothbrushes, kitchen items or utensils, or office products, or the like).

In certain embodiments, a supporting structure 10 may be, form part of, or be housed within a container 16 (e.g., a box). In selected embodiments, a container 16 may include a base 18 and cover 20 and may house multiple inserts 14 (e.g., house multiple inserts 14 within a base 18, a cover 20, or some combination thereof). A base 18 may have an interior volume. For example, a base 18 may include a back panel 22 and various side walls 24 (e.g., four side walls 24). The back panel 22 and side walls 24 may be connected (e.g., monolithically formed) to form an open container. The interior length and width of the back panel 22 and the interior height of the side walls 24 may collectively define an interior volume corresponding to a base 18.

Figure 1:
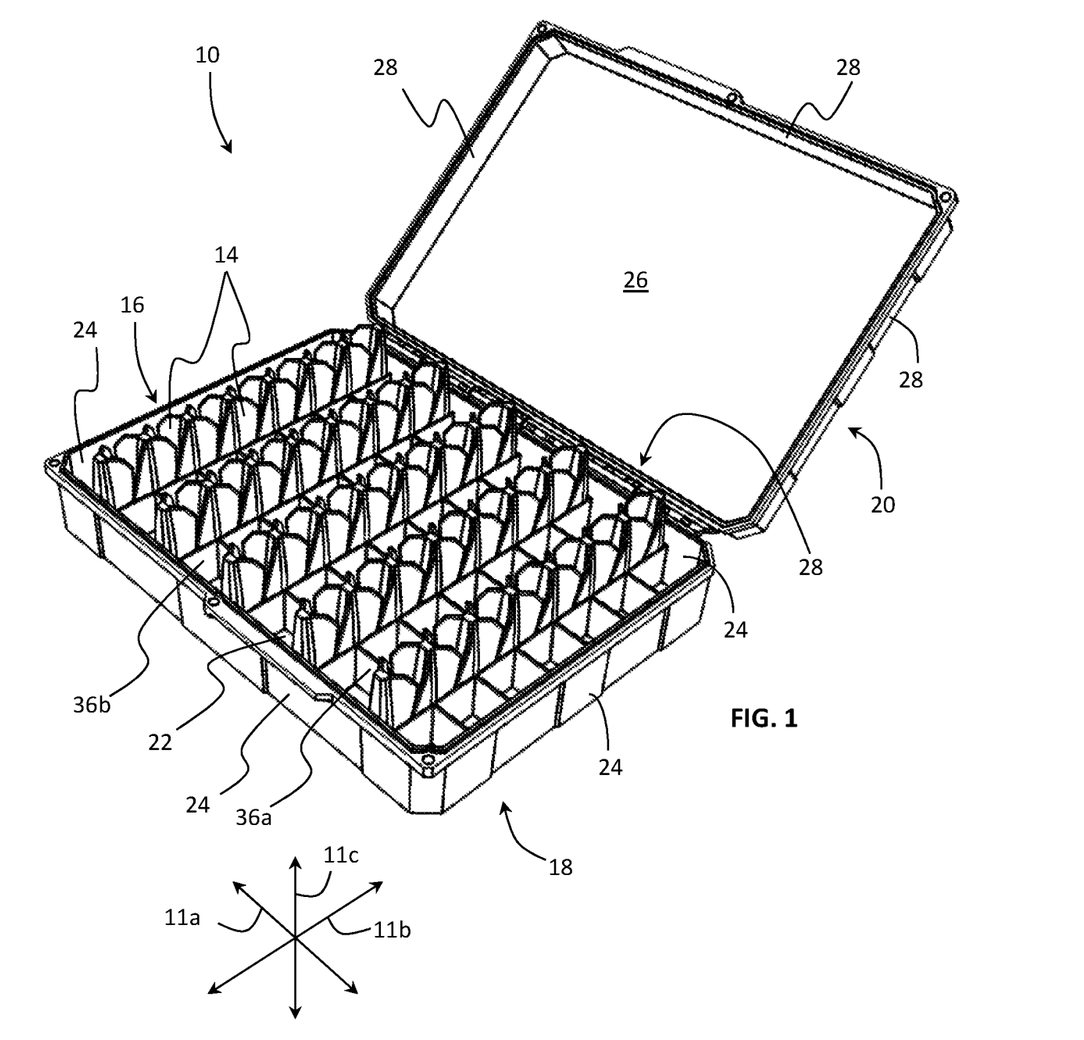
FIG. 1 is a perspective view of one embodiment of a retention and storage apparatus in accordance with the present invention with the cover in an open position.

A cover 20 may also have an interior volume. For example, a cover 20 may include a front panel 26 and various side walls 28 (e.g., four side walls 28). The front panel 26 and side walls 28 may be connected (e.g., monolithically formed) to form an open container. The interior length and width of the front panel 26 and the interior height of the side walls 28 may collectively define an interior volume corresponding to a cover 20.

In selected embodiments, a cover 20 may pivotably engage a base 18. Accordingly, a cover 20 may pivot with respect to a base 18 through a range of motion. Such a range of motion may include a closed position at one extreme thereof and a fully open position at an opposite extreme thereof. When in the closed position, a cover 20 may engage a base 18, a base 18 may engage a cover 20, or a closure mechanism may engage both a cover 20 and a base 18 to selectively hold the container 16 in the closed position.

When in the closed position, a cover 20 may cooperate with a base 18 to form an enclosure. Such an enclosure may have an overall interior volume comprising the interior volume corresponding to a cover 20 and the interior volume corresponding to a base 18. For example, an enclosure may have an overall volume equal or substantially equal to the sum of the interior volume corresponding to a cover 20 and the interior volume corresponding to a base 18.

A cover 20 may have an interior volume that is different from an interior volume of a corresponding base 18. Alternatively, a cover 20 may have an interior volume that is equal or substantially equal to an interior volume of a corresponding base 18. For example, in selected embodiments, a cover 20 may be substantially identical to (e.g., produced from the same mold as) a base 18.

A base 18 and cover 20 may be formed of any suitable material or combination of materials. In selected embodiments, a base 18 and cover 20 may each comprise a molded (e.g., injection molded) polymeric material. For example, a base 18 and cover 20 may each be molded in a polycarbonate material.

A base 18 and cover 20 may have differing transparency or opacity. For example, in selected embodiments, a base 18 may be opaque or substantially opaque while a cover 20 may be transparent or substantially transparent. A transparent cover 20 may enable a user to readily see what item or items are contained within the corresponding container 16 without having to first open the container 16.

Figure 2:
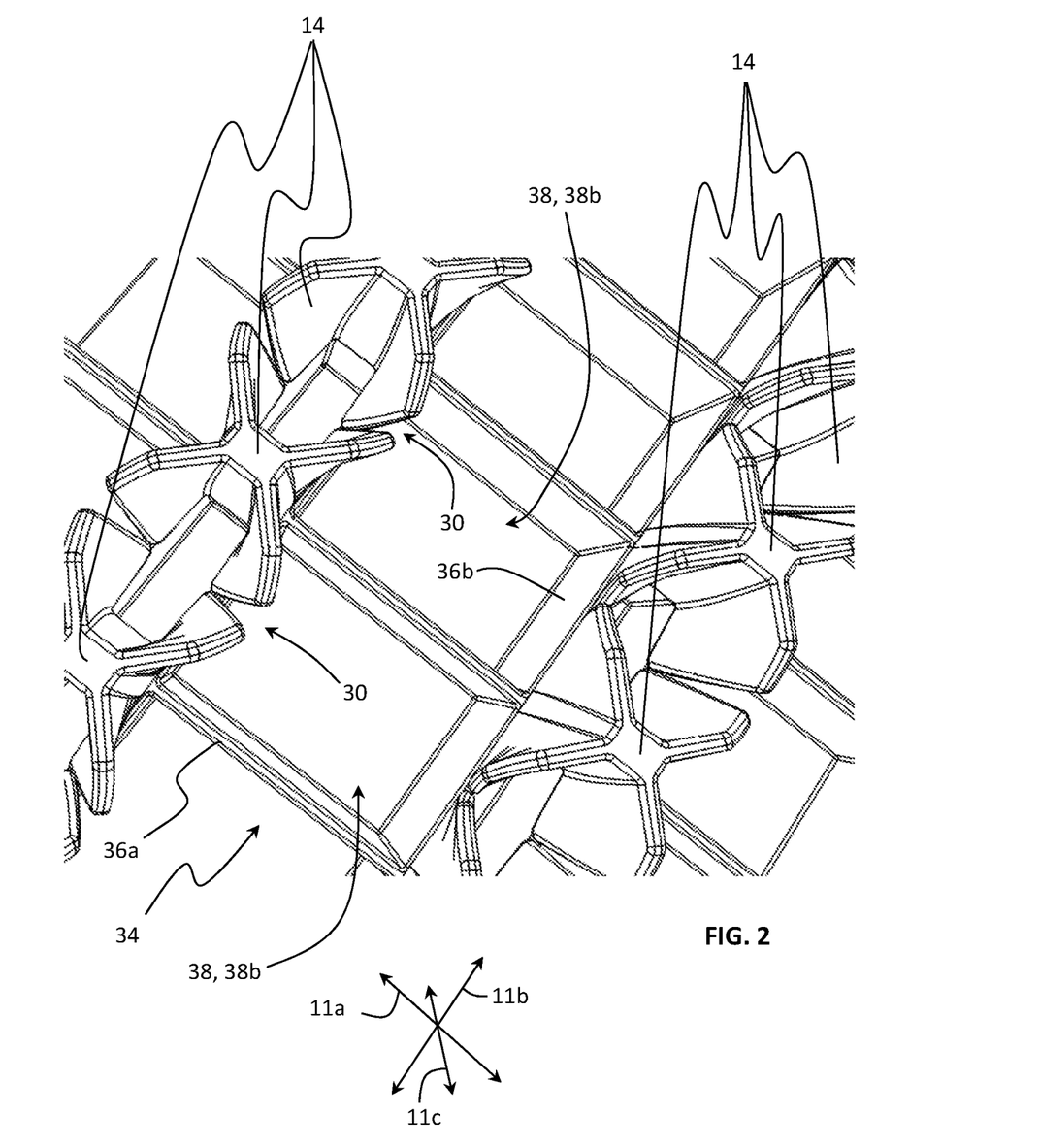
FIG. 2 is a partial perspective view of the interior the apparatus of FIG. 1.

Adjacent inserts 14 in accordance with the present invention may provide a location 30 or retention site 30 therebetween for securing one or more items (e.g., fishing lures, hard baits, or the like or other items as described above). In selected embodiments, an array of inserts 14 may provide an array of retention sites 30.

An insert 14 may comprise a molded (e.g., injection molded, cast, formed in a mold, or the like) or otherwise formed piece of urethane, neoprene rubber, natural rubber, polyurethane, Buna-N rubber (i.e., nitrile butadiene rubber), thermoplastic elastomer (TPE), other elastomeric material, or the like. In selected embodiments, an insert 14 may comprise a molded piece of silicone rubber. The silicone rubber may have a Shore hardness in the range of about 30A to about 70A, more preferably in the range from about 40A to about 60A, and most preferably about 50A.

Figure 3:
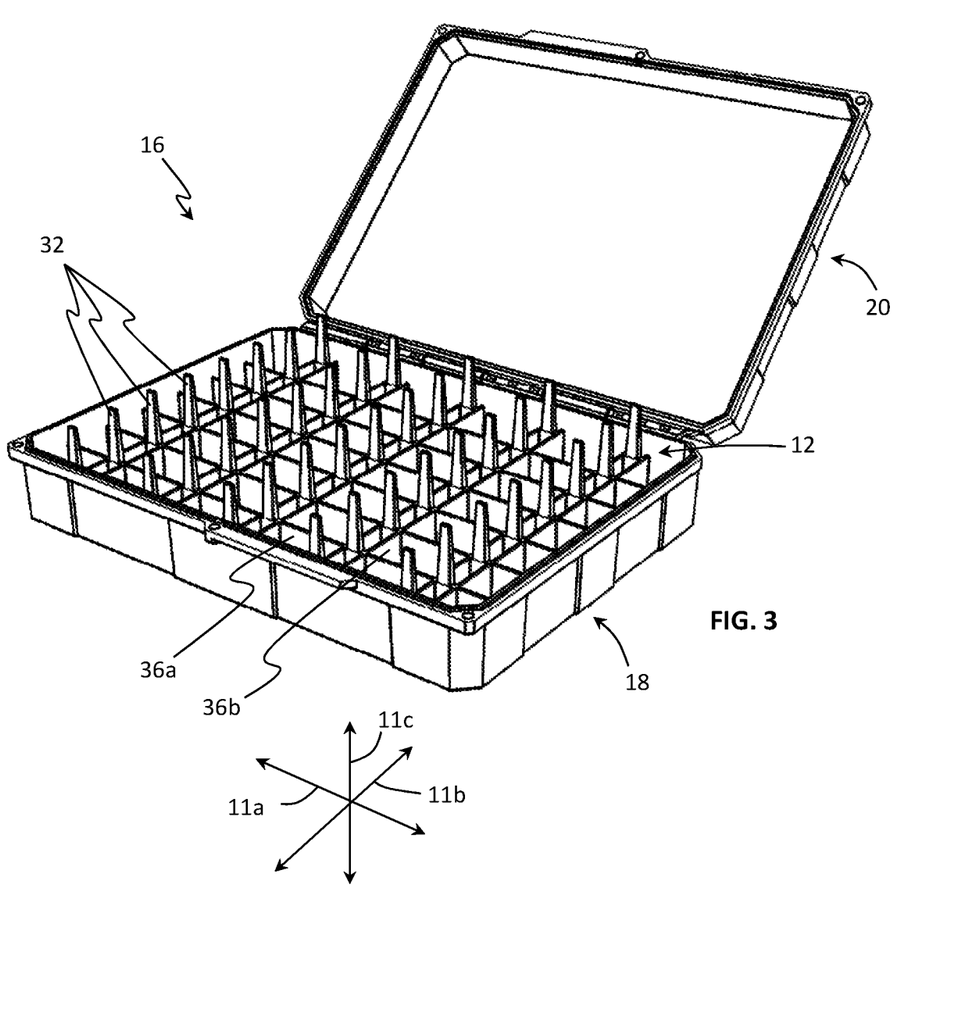
FIG. 3 is a perspective view of the apparatus of FIG. 1 with all of the inserts removed.
Figure 4:
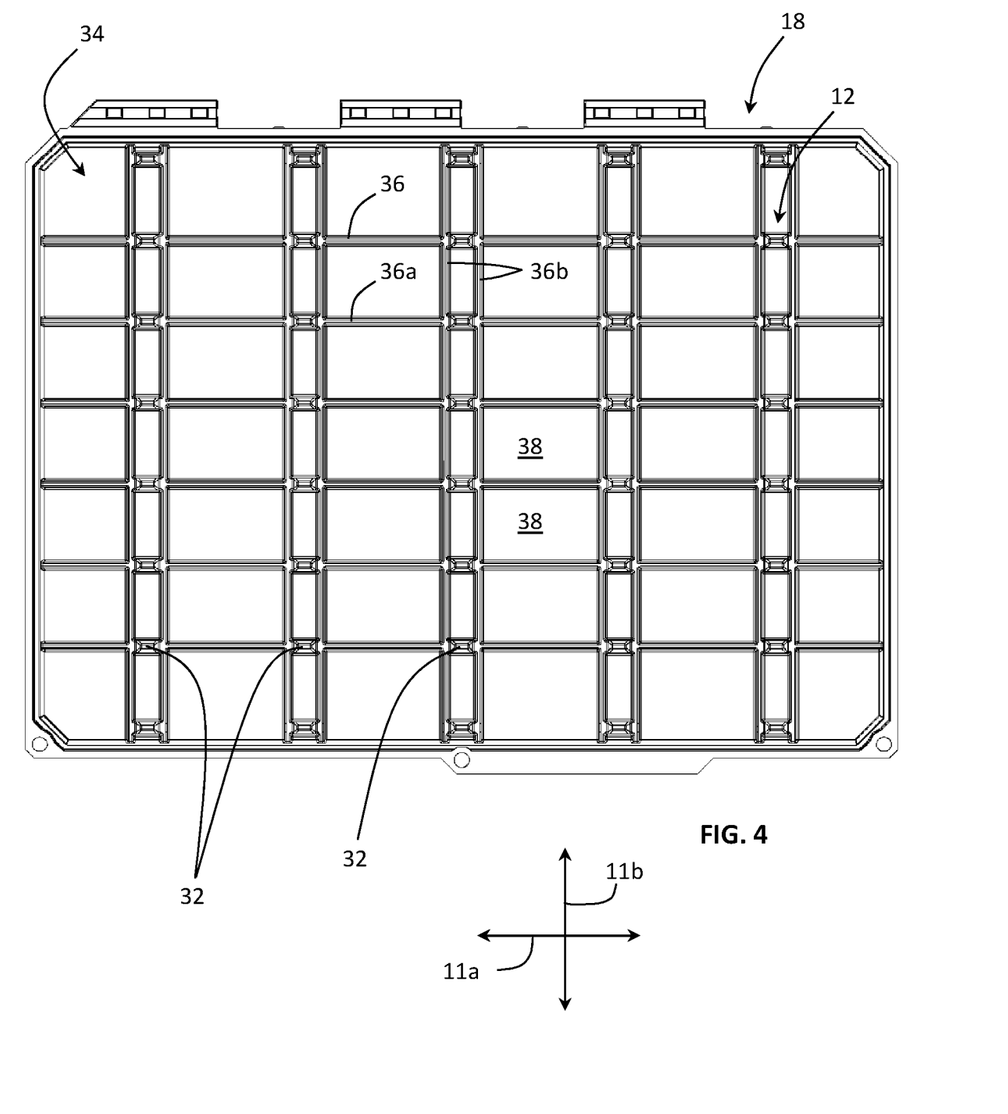
FIG. 4 is a top plan view of the base of the apparatus of FIG. 1.

In selected embodiments, an insert 14 may mechanically engage some portion of a supporting structure 12. For example, a supporting structure 12 may include one or more extensions 32 shaped to mechanically engage (e.g., extend into and frictionally engage) one or more corresponding apertures located on an underside of an insert 14. Alternatively, or in addition thereto, an insert 14 may be secured to a supporting structure 12 by an adhesive (e.g., a layer comprising a low surface energy adhesive).

In selected embodiments, an adhesive used to secure one or more inserts 14 of elastomeric material (e.g., silicone rubber) may be the 300LSE adhesive marketed by 3M. For example, a double-sided tape comprising the 300LSE adhesive may form an adhesive layer directly interfacing between an insert 14 of elastomeric material and a supporting structure 12 (e.g., an interior surface of a container 16). In other embodiments, an adhesive (e.g., a silicone-based adhesive) such as room temperature vulcanizing (RTV) adhesive, cyanoacrylate, or other suitable liquid adhesive may be used to secure one or more inserts 14 to a supporting structure 12.

An extension 32 in accordance with the present invention may have any suitable configuration. In selected embodiments, an extension 32 may comprise a cantilevered wall or wall segment extending from a back panel 22, front panel 26, or other supporting structure 12 or portion thereof. In certain embodiments, multiple extensions 32 may extend from a grid 34 formed of various intersecting walls 36. For example, multiple extensions 32 may extend in the transverse direction 11c from a grid 34 comprising multiple longitudinal walls 36a extending parallel to one another in the longitudinal direction 11a from one end of a panel 22, 26 to the other and multiple lateral walls 36b extending parallel to one another in the lateral direction 11b from one side of the panel 22, 26 to the other. Thus, the longitudinal and lateral walls 36a, 36b may intersect at right angles and connect to and reinforce each other.

In certain embodiments, a grid 34 may form a plurality of volumes 38 that are cordoned off from one another by the various walls 36. Certain such volumes 38 may receive portions of one or more items secured in adjacent retentions sites 30. For example, one or more such volumes 38 may receive hooks (e.g., treble hooks) or the like that hang from a fishing lure, hard bait, or the like whose body is secured within one or more adjacent retention sites 30.

In selected embodiments or applications, the hooks of a first fishing lure, hard bait, or the like whose body is held in a first retention site 30a may hang within or occupy one or more first volumes 38a, while the hooks of a second fishing lure, hard bait, or the like whose body is held in a second retention site 30b may hang within or occupy one or more second volumes 38b. Thus, the hooks of the first fishing lure, hard bait, or the like may be separated from the hooks of the second fishing lure, hard bait, or the like. Accordingly, in a retention system 10, a first item (e.g., a one fishing lure, hard bait, or the like) may be inserted, carried, and/or removed without interfering with (e.g., contacting, snagging on, scratching, chipping) one or more adjacent items (e.g., one or more adjacent fishing lures, hard baits, or the like).

In certain embodiments or applications, one or more first walls 36 (e.g., one or more longitudinal walls 36a) may block the hooks of one fishing lure, hard bait, or the like from interfering with an adjacent fishing lure, hard bait, or the like, while one or more other walls 36 (e.g., one or more lateral walls 36b) may block the hooks of one or more fishing lures, hard baits, or the like from snagging on one or more inserts 14 (e.g., may prevent a hook from accessing or entering an area below a corresponding or adjacent insert 14).

In certain embodiments, one or more extensions 32, a grid 34, or a combination thereof may be formed separately from a base 18, cover 20, or the like. In such embodiments, the one or more extensions 32, a grid 34, or combination thereof may be inserted within the base 18, cover 20, or the like during an assembly process. Alternatively, one or more extensions 32, a grid 34, or a combination thereof may be monolithically formed as part of a base 18, cover 20, or the like (e.g., in a molding process).

In still other embodiments, a supporting structure 12 may comprise one or more extensions 32 extending from a grid 34 or one or more extensions 32 extending from a plate so that one or more inserts 14 may be used to secure items outside of any container 16 (e.g., on a boat, dashboard, work bench, drawer interior, wall, countertop, or the like). In such embodiments, a grid 34 or plate may include an adhesive material, one or more apertures for fasteners (e.g., screws), or the like to enable the supporting structure 12 to be secured in a desired location.

A grid 34 may provide one or more locations for portions of one or more items to reside. The grid 34 may prevent those portions from contacting, snagging, or damaging one another. In selected embodiments, when such prevention is not needed, a grid 34 may be omitted. For example, in certain embodiments, a supporting structure 12 may comprise one or more extensions 32 extending from a plate or planar surface.

A retention system 10 and certain components thereof (e.g., one or more inserts 14 and a supporting structure 12 corresponding thereto) may be scaled as needed. In general, the larger the items to be stored, the larger the retention system 10 (e.g., the larger the inserts 14). For example, inserts 14 configured to secure a fishing rod may be larger than inserts 14 configured to secure a hard bait.

Referring to FIGS. 5-10, in selected embodiments, one or more inserts 14 may each comprise a hub 40 and one or more flanges 42 that extend away from the hub 40. A hub 40 may have an aperture 44 located on an underside thereof. The aperture 44 may be shaped and sized to receive an extension 32 therewithin. For example, in certain embodiments, a hub 40 may extend along an axis and an aperture 44 may extend within the hub 40 along that axis The engagement between an aperture 44 of an insert 14 and an extension 32 of a supporting structure 12 may secure (or contribute to the securement of) the insert 14 to the support structure 12. In selected embodiments, an aperture 44 and an extension 32 corresponding thereto may extend a length (e.g., more than half way, more than three quarters of the way, more than seven eighths of the way) into a hub 40. Thus, an extension 32 may form a backbone that resists deflection of the hub 40, even in embodiments where the hub 40 is formed of a flexible (e.g., elastomeric) material.

In selected embodiments, one or more flanges 42 of an insert 14 may be resiliently flexible. Thus, when a flange 42 is deflected out of its neutral position, it may seek to resiliently return to its neutral position. This resiliency alone or in combination with a natural stickiness of a material (e.g., elastomeric material) forming the flange 42 may provide clamping and/or frictional forces that secure one or more items 46 (e.g., fishing lures, hard baits, hand tools, toothbrushes, or other items or the like) within a retention site 30.

For example, a retention site 30 may comprise a slit, gap, or the like located between a distal edge of a flange 42 of one insert 14 and a distal edge of a flange 42 of an adjacent insert 14. The distal edges defining a particular slit (e.g., a particular retention site 30) may abut one another or nearly abut one another. In certain embodiments, the distal edges defining a particular slit may be spaced away from each other more at the top, mouth, or entrance of a retention site 30 than at the bottom or root of the retention site 30. For example, the distal edges may gradually transition from a significant gap therebetween at the top, mouth, or entrance of a retention site 30 to touching or nearly touch at the bottom or root of the retention site 30.

Figure 10:
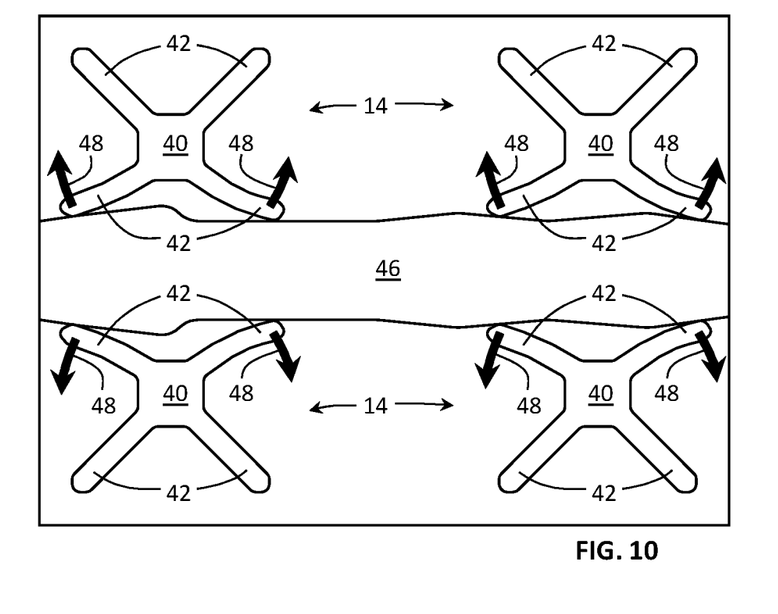
FIG. 10 is a schematic diagram of the tops of four inserts of in their deflected configurations.

Accordingly, when an item 46 (e.g., a fishing lure, hard bait, or the like) or a portion thereof is inserted into the slit, the corresponding flanges 42 may be pushed apart (e.g., the flanges may be deflected 48 outward). A resiliency in the material forming the adjacent inserts 14 may urge the flanges 42 to return to their neutral configuration. This urging may generate a frictional engagement (i.e., a frictional engagement between the flanges 42 and the item 46) that grips the body of the item 46 and prevents it from inadvertently exiting the retention site 30.

In selected embodiments, one or more flanges 42 may be shaped to facilitate admittance of an item 46 into one or more retention sites 30. For example, the flanges 42 proximate a distal edge thereof may have any angle 49 formed therein. The angle 49 may be located proximate a top, mouth, or entrance of a retention site 30. Thus, one or more flanges 42 may slope or taper toward a retention site 30.

Alternatively, or in addition thereto, one or more flanges 42 may angle or twist outward proximate a top, mouth, or entrance of a retention site 30. For example, a bottom edge of a flange 42 may extend in one direction (e.g., align with and/or track an underlying wall 36), while a top edge of the flange 42 may extend in another direction. This may open a top, mouth, or entrance of a retention site 30, making it easier to insert an item 46 therein. Additionally, the angle or twist may ensure that deflection 48 of the flanges 42 will be predictable, consistent, and outward (i.e., not haphazard or inward where interference or confinement may occur).

Figure 5:
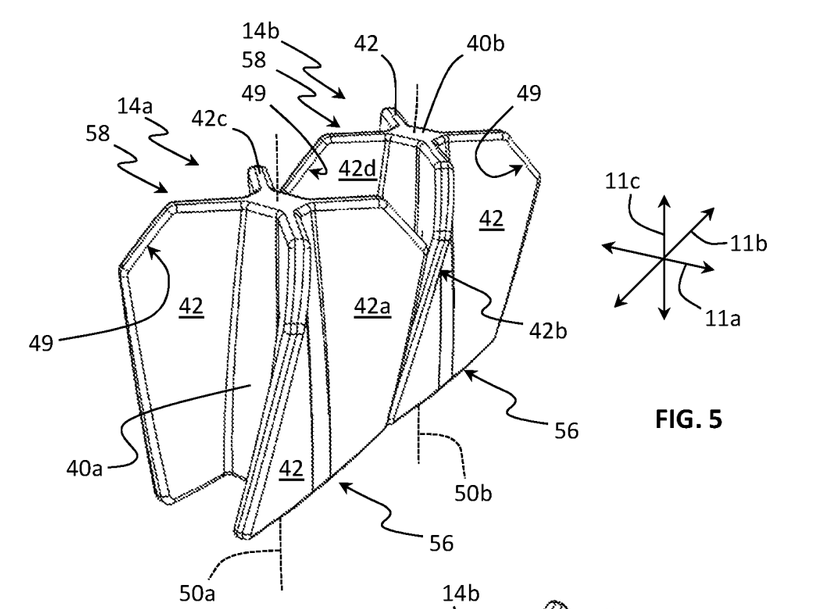
FIG. 5 is a first top perspective view of two adjacent inserts of the apparatus of FIG. 1.
Figure 6:
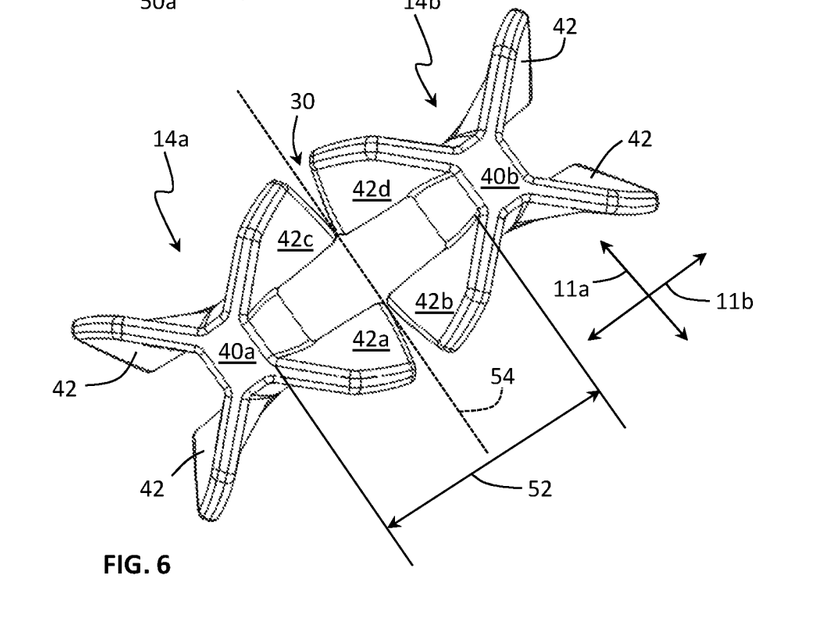
FIG. 6 is a second top perspective view of two adjacent inserts of the apparatus of FIG. 1.
Figure 7:
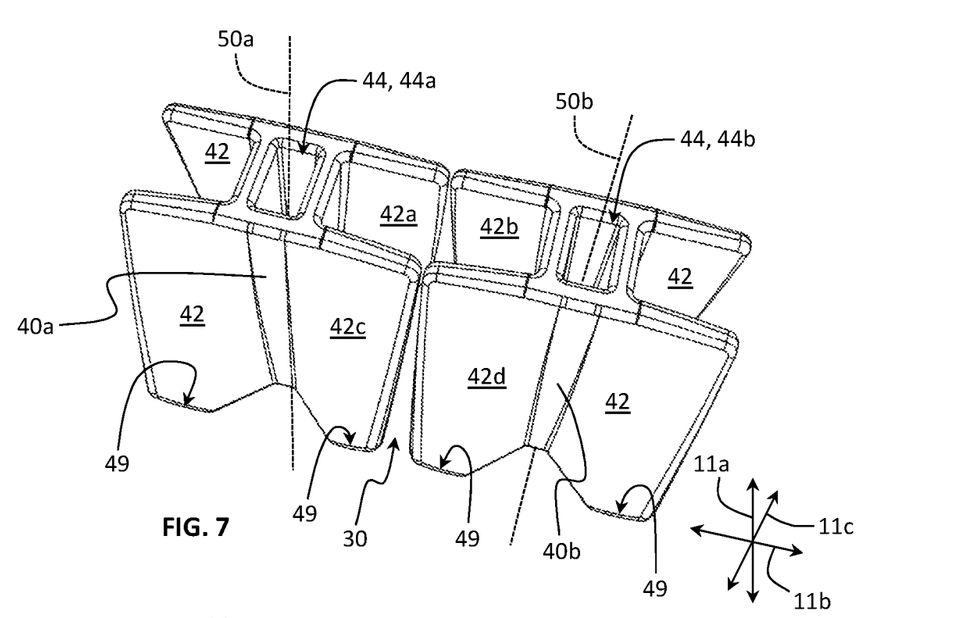
FIG. 7 is a bottom perspective view of two adjacent inserts of the apparatus of FIG. 1.

An insert 14 in accordance with the present invention may have one or more flanges 42. The number of flanges 42 and the locations of those flanges 42 may enable a corresponding insert 14 to support one or more retention sites 30. For example, in selected embodiments, two flanges 42 corresponding to one insert 14 may extend toward or be opposed by two flanges 42 corresponding to an adjacent insert 14 to form one retention site 30 therebetween. Such a "double flange" retention site 30 may provide a balanced and stable gripping of the item 46 placed therewithin.

Figure 8:
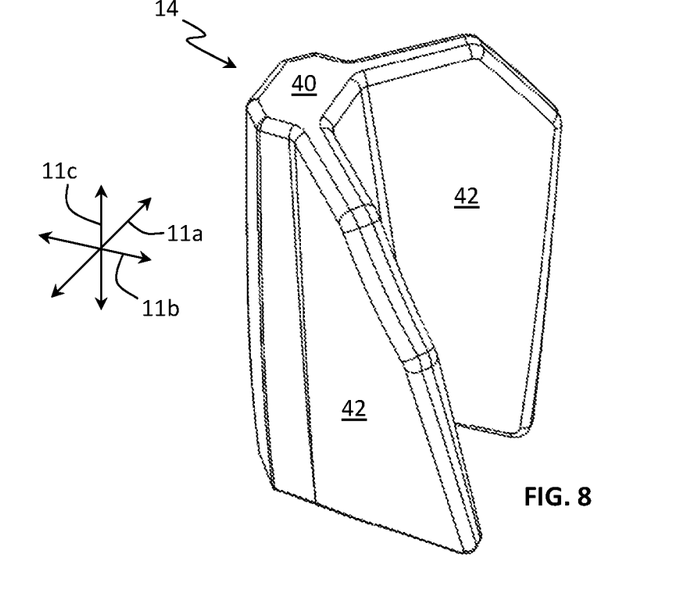
FIG. 8 is a top perspective view of an insert used proximate an edge of the box of the apparatus of FIG. 1.

In selected embodiments, certain inserts 14 may have four flanges 42 extending therefrom. Such inserts 14 may support two double flange retention sites 30 (e.g., one retention site 30 with an adjacent insert 14 on one side and another retention site 30 with another adjacent insert 14 on the other side). In certain embodiments or locations, an insert 14 may have only two flanges 42. For example, an insert 14 positioned adjacent a wall 24, 28 of a container 16 may have flanges 42 (e.g., two flanges 42) only on one side (i.e., the side away from the wall 24, 28).

Figure 9:
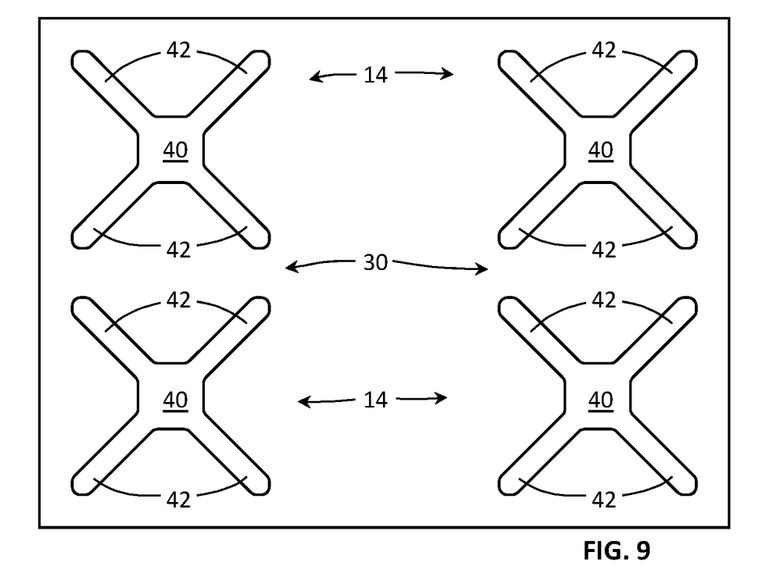
FIG. 9 is a schematic diagram of the tops of four inserts in their neutral configurations.

In selected embodiments, inserts 14 may be arranged in an array where a retention site 30 corresponding to a first pair of inserts 14 may be aligned with a retention site 30 corresponding to a second pair of inserts 14. Thus, items 46 (e.g., fishing lures, hard baits, or the like) that have a relatively long body may be supported by or gripped within multiple retention sites 30.

Retention systems 10 in accordance with the present invention may have any of the various structures, features, and the like described above or in the materials incorporated by reference or any desirable combination or sub-combinations thereof. Two exemplary embodiments of systems 10 in accordance with the present invention and a method of using those systems 10 are provided below.

In a first exemplary embodiment, a retention system 10 in accordance with the present invention may comprise (1) a first hub 40a extending along a first axis 50a; (2) a second hub 40b extending along a second axis 50b parallel to the first axis 50a; (3) a gap 52 between the first and second hubs 40a, 40b; and (4) first and second flanges 42a, 42b formed of an elastomeric material. The first flange 42a may connect to the first hub 40a and extend away from the first axis 50a and into the gap 52. The second flange 42b may connect to the second hub 40b and extend away from the second axis 50b and into the gap 52. The first and second flanges 42a, 42b may mirror one another across a plane 54 bisecting the gap 52.

In the first exemplary embodiment, the first and second hubs 40a, 40b may be formed of the same elastomeric material as the first and second flanges 42a, 42b. For example, the first flange 42a may be a monolithic extension of the first hub 40a and the second flange 42b may be a monolithic extension of the second hub 40b.

In a second exemplary embodiment, a retention system 10 may include (1) a supporting structure 12; (2) a first insert 14a connected to the supporting structure 12; and a second insert 14b connected to the supporting structure 12. The first insert 14a may comprise a first hub 40a extending along a first axis 50a, a first flange 42a formed of elastomeric material, and a second flange 42c formed of elastomeric material. The first and second flanges 42a, 42c may connect to the first hub 40a and extend away from the first axis 50a. Similarly, the second insert 14b may comprise a second hub 40b extending along a second axis 50b parallel to the first axis 50a, a third flange 42b formed of elastomeric material, and a fourth flange 42d formed of elastomeric material. The third and fourth flanges 42b, 42d may connect to the second hub 40b and extend away from the second axis 50b. The first and second flanges 42a, 42c may mirror the third and fourth flanges 42b, 42d across a plane 54 bisecting a gap 52 separating the first and second hubs 40a, 40b.

In the second exemplary embodiment, the first and second inserts 14a, 14b may each have a bottom 56 and a top 58. The first and second flanges 42a, 42c may be substantially parallel to one another at the bottom 56 of the first insert 14a. However, the first and second flanges 42a, 42c may diverge at the top 58 of the first insert 14a. Similarly, the third and fourth flanges 42b, 42d may be substantially parallel to one another at the bottom 56 of the second insert 14b, but the third and fourth flanges 42b, 42d may diverge at the top 58 of the second insert 14b.

In the second exemplary embodiment, the first and second hubs 40a, 40b may be formed of the same elastomeric material as the various flanges 42a, 42b, 42c, 42d. For example, the first and second flanges 42a, 42c may be monolithic extensions of the first hub 40a and the third and fourth flanges 42b 42d may be monolithic extensions of the second hub 40b.

In either the first or second exemplary embodiment, the first hub 40a may comprise a first aperture 44a extending therewithin along the first axis 50a. Similarly, the second hub 40b may comprise a second aperture 44b extending therewithin along the second axis 50b. Accordingly, a first extension 32 may impart rigidity to the first hub 40a by extending into the first aperture 44a. Similarly, a second extension 32 may impart rigidity to the second hub 40b by extending into the second aperture 44b. The first and second extensions 32 may be both formed of a polymeric material exhibiting greater rigidity than the elastomeric material from which the first and second hubs 40a, 40b and the various flanges 42a, 42b, 42c, 42d are formed.

In either the first or second exemplary embodiment, a supporting structure 12 may comprise, in addition to the first and second extensions 32, a grid 34 of intersecting walls 36 positioned below the first and second hubs 40a, 40b. The grid 34 may be formed of the same polymeric material as the first and second extensions 32. Accordingly, the first and second extensions 32 may extend monolithically upward from the grid 34.

In either the first or second embodiment, first and second hubs 40a, 40b and corresponding flanges 42a, 42b, 42c, 42d may be used or deployed outside of any container 16. Alternatively, the first and second hubs 40a, 40b and the corresponding flanges 42a, 42b, 42c, 42d may be housed within a container 16.

In a third embodiment, a method for using a retention system 10 in accordance with the present invention may include (1) obtaining a retention system 10 (e.g., a retention system 40 in accordance with the first exemplary embodiment or the second exemplary embodiment); (2) inserting an item 46 into a gap 52 between the first and second hubs 40a, 40b; (3) deflecting, during the inserting, selected flanges 42a, 42b, 42c, 42d corresponding to the first and second hubs 40a, 40b; and (4) holding, by the selected flanges 42a, 42b, 42c, 42d after the inserting, the item 46 in place within the gap 52. In the third embodiment, the item 46 may be a piece of fishing tackle.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A retention system comprising:
   a two-dimensional array of hubs comprising a first hub extending along a first axis and a second hub extending along a second axis parallel to the first axis, wherein the first hub comprises a first aperture extending therewithin along the first axis and the second hub comprises a second aperture extending therewithin along the second axis;
   a gap between the first and second hubs;
   first and second elastomeric flanges connected to the first hub and extending away from the first axis and into the gap; and
   third and fourth elastomeric flanges connected to the second hub and extending away from the second axis and into the gap.

2. The system of claim 1, wherein the first and second elastomeric flanges mirror the third and fourth elastomeric flanges across a plane bisecting the gap.

3. The system of claim 1, wherein the first and second elastomeric flanges mirror one another across a plane containing the first axis and the second axis.

4. The system of claim 3, wherein:
   the first and second elastomeric flanges are monolithic extensions of the first hub; and
   the third and fourth elastomeric flanges are monolithic extensions of the second hub.

5. The system of claim 1, further comprising:
   a first extension extending into the first aperture and having a material composition that is less elastic than that of the first hub; and
   a second extension extending into the second aperture and having a material composition that is less elastic than that of the second hub.

6. The system of claim 5, further comprising a grid of intersecting walls positioned below the first and second hubs, the grid being formed of the polymeric material.

7. The system of claim 6, wherein the first and second extensions extend monolithically upward from the grid.

8. The system of claim 1, wherein the first and second elastomeric flanges are each spaced from, and on opposite sides of, a plane containing the first axis and the second axis.

9. The system of claim 1, further comprising a container housing therewithin the first and second hubs, the first and second elastomeric flanges, and the third and fourth elastomeric flanges.

10. The system of claim 1, wherein:
the first hub has a bottom and a top; and
the first and second flanges are substantially parallel to one another proximate the bottom of the first hub.

11. The system of claim 10, wherein the first and second flanges diverge from one another proximate the top of the first hub.

12. A retention system comprising:
a supporting structure comprising a first extension and a second extension;
a first insert comprising
a first hub having a first aperture into which the first extension extends,
first and second flanges formed of elastomeric material, and
the first and second flanges connected to the first hub and extending away therefrom;
a second insert comprising
a second hub having a second aperture into which the second extension extends,
third and fourth flanges formed of elastomeric material, and
the third and fourth flanges connected to the second hub and extending away therefrom; and
the first and second inserts positioned with respect to one another such that
a gap separates the first hub from the second hub,
the first and second flanges each extend into the gap,
the third and fourth flanges each extend into the gap, and
the first and second flanges mirror the third and fourth flanges across a plane bisecting the gap.

13. The system of claim 12, wherein
the first and second flanges are each a monolithic extension of the first hub; and
the third and fourth flanges are each a monolithic extension of the second hub.

14. The system of claim 12, wherein:
the first and second hubs are formed of elastomeric material; and
the first and second extensions are respectively formed of material that is less elastic than that of the first and second hubs.

15. The system of claim 14, wherein the first and second inserts form part of a two-dimensional array of inserts connected the supporting structure.

16. The system of claim 15, wherein:
the supporting structure comprises a grid of intersecting walls positioned below the first and second inserts; and
the first and second extensions extend monolithically upward from the grid.

17. The system of claim 12, wherein:
the first and second inserts each have a bottom and a top;
the first and second flanges are substantially parallel to one another at the bottom of the first insert; and
the third and fourth flanges are substantially parallel to one another at the bottom of the second insert.

18. The system of claim 17, wherein:
the first and second flanges diverge at the top of the first insert; and
the third and fourth flanges diverge at the top of the second insert.

19. The system of claim 12, further comprising a container housing therewithin the supporting structure and the first and second inserts.

* * * * *